IMMEDIATE RINGING CIRCUIT FOR TELEPHONE SYSTEMS

Filed Dec. 10, 1964

INVENTOR
R. M. SWANSON
BY Howard L. Popper
ATTORNEY 3,350,508

IMMEDIATE RINGING CIRCUIT FOR TELEPHONE SYSTEMS

Richard M. Swanson, Holmdel Township, Monmouth County, N.J., assignor to Bell Telephone Laboratories, Incorporated, New York, N.Y., a corporation of New York Filed Dec. 10, 1964, Ser. No. 417,342

8 Claims. (Cl. 179—18)

This invention relates to telephone systems and more particularly to equipment for providing immediate ringing signals to called lines of such systems.

In the past, telephone offices of various types have had ringing voltage supplied to called lines from several different kinds of ringing sources. For example, in crossbar telephone offices, ringing voltage is often generated by a rotating ringing machine which is connected to a local line's ringer through a crossbar ringing selection switch and the incoming trunk which has been activated in response to an incoming call. The ringing machine usually has a plurality of standard brushes which alternate in presenting ringing voltage across their output terminals, thereby establishing a periodic on-off ringing cycle. Normally, when an incoming trunk circuit to a crossbar office is energized, the marker circuit is instructed to provide a particular kind of coded ringing to a called line over the incoming trunk. The code selected depends on the type of line to be rung and the code to which the subscriber will respond.

The ringing generator brushes provide ringing voltage to the incoming trunk through the means of a connection from one of the plurality of brushes to the trunk through a single predetermined level of a multilevel crossbar ringing selection switch. Since the prior ringing arrangements have utilized just this one selection switch level, and since the ringing generator has only one active ringing voltage brush at a given time, there is a significant probability that the marker may cause the incoming trunk circuit to be connected to one of the several brushes not then presenting ringing voltage. The trunk is then said to be connected to the ringing generator during the so-called "silent interval." For example, if the ringing generator has three output brushes supplying ringing voltage and only one of these brushes is "live" at any given instant, random connection to one of these brushes results in a probability that only one-third of the called lines will be immediately rung; consequently, two-thirds of the lines, although connected to the ringing source, will experience a delay depending upon the duration of the ringing cycle before actual audible ringing activates the called line's ringer circuit. Thus, although ringing will ultimately (within a few seconds) be applied to the called line, there will be a delay for several lines. This adds to trunk holding time (prior to the called subscriber's going off hook, this added time is not billed to anyone) and leads to a reduction in the overall speed of service.

An additional problem occasionally arises in this area when a called line which has already been seized by an incoming call, but not yet rung as described above, itself goes off hook to commence an outgoing call. Such seizure during the silent interval prior to ringing prevents the returning of dial tone to the off-hook station, and inevitably confuses both parties by the apparent "mysterious" establishment of a talking path between the parties. At the very least, there is mutual curiosity when the original calling party hears no ringback tone and the original called party detects talking on what should apparently be an idle line.

It is, therefore, an object of this invention to reduce the time between the seizure of an incoming trunk and line and the application thereto of ringing voltage.

It is a further object of this invention to reduce the unnecessary holding time of trunks on incoming calls.

In one particular embodiment of my invention, I provide immediate ringing to called lines of a crossbar telephone system by an arrangement including a synchronizing circuit and accompanying modifications of existing crossbar circuitry. As indicated above, one problem my invention will solve is the presentation of only one phase of the ringing voltage signal to the called line due to the availability of only a single ringing selection switch level of each switch. Immediate ringing in the prior art is thus dependent on which ringing voltage phase happens to be connected to the single level of the ringing selection switch. Since each such phase has a longer silent interval than an active interval, the difficulty of ringing delay is apparent. In order to alleviate this, a plurality of ringing selection switch levels is set aside by my invention on a one-to-one relationship to the ringing generator phases. A sufficient number of switch levels are connected in this manner so as to cover the entire cycle during which ringing voltage phases are supplied by the plurality of brushes. For example, assuming a 6-second ringing cycle with three ringing generator brushes successively supplying two seconds of ringing voltage, three ringing selection switch levels would be necessary to provide immediate ringing to the called line no matter when the ringing selection switch was energized, as long as the proper switch level was selected.

The synchronizing circuit which I provide is coupled between the crossbar marker circuit and the ringing generator. It is energized in response to selected coded outputs of voltage from the ringing generator and provides a "forecast" to the marker of which ringing selection switch level should be chosen so that immediate ringing voltage will be applied therethrough to the incoming trunk. The marker circuit is thereby informed which of the three ringing generator brushes is "live" at that instant or will be so for a given predetermined time thereafter, and the marker is instructed to select the proper one of the three possible ringing switch levels to provide immediate ringing to the called line. Since it is possible for the incoming trunk to be energized relatively late in the active ringing voltage portion of a particular brush's cycle, the synchronization circuit is arranged to be appropriately energized in response to selected coded voltage outputs from the ringing generator to cause the marker to select the ringing selection switch level which corresponds to the subsequent live brush rather than the one which is instantaneously live. This allows for the inherent electro-mechanical time delay required to energize the marker and for the marker to in turn activate the ringing selection switch; selection of a subsequent switch level insures that a full ringing voltage cycle will be applied after a minimal delay. Absent this feature, the marker might select the switch level associated with the brush which is just ending its active cycle so that the delay in providing ringing sought to be obviated by my invention would otherwise be reintroduced at times.

It is therefore a feature of this invention that means are included for connecting the active brush or phase on a ringing generator to an incoming trunk immediately upon seizure of said trunk by an incoming call.

A further feature of this invention includes facilities under control of control signals from the ringing generator for determining which one of a plurality of ringing generator brushes is live at a particular instant of time. More specifically, these facilities include a relay counting circuit.

Another feature of this invention is equipment for informing a crossbar marker circuit which of a plurality of ringing selection switch levels should be connected to a called line via an incoming trunk circuit.

Still another feature of this invention includes means for making available ringing voltage through a ringing selection switch at all times through the use of a plurality of levels of the switch.

A further feature of this invention includes synchronizing means for selecting the one of the ringing selection switch levels which instantaneously is, or momentarily will be, supplied with ringing voltage.

These and other objects and features of this invention will be more readily understood with reference to the following specification, appended claims and attached drawing, in which:

Figure 1:
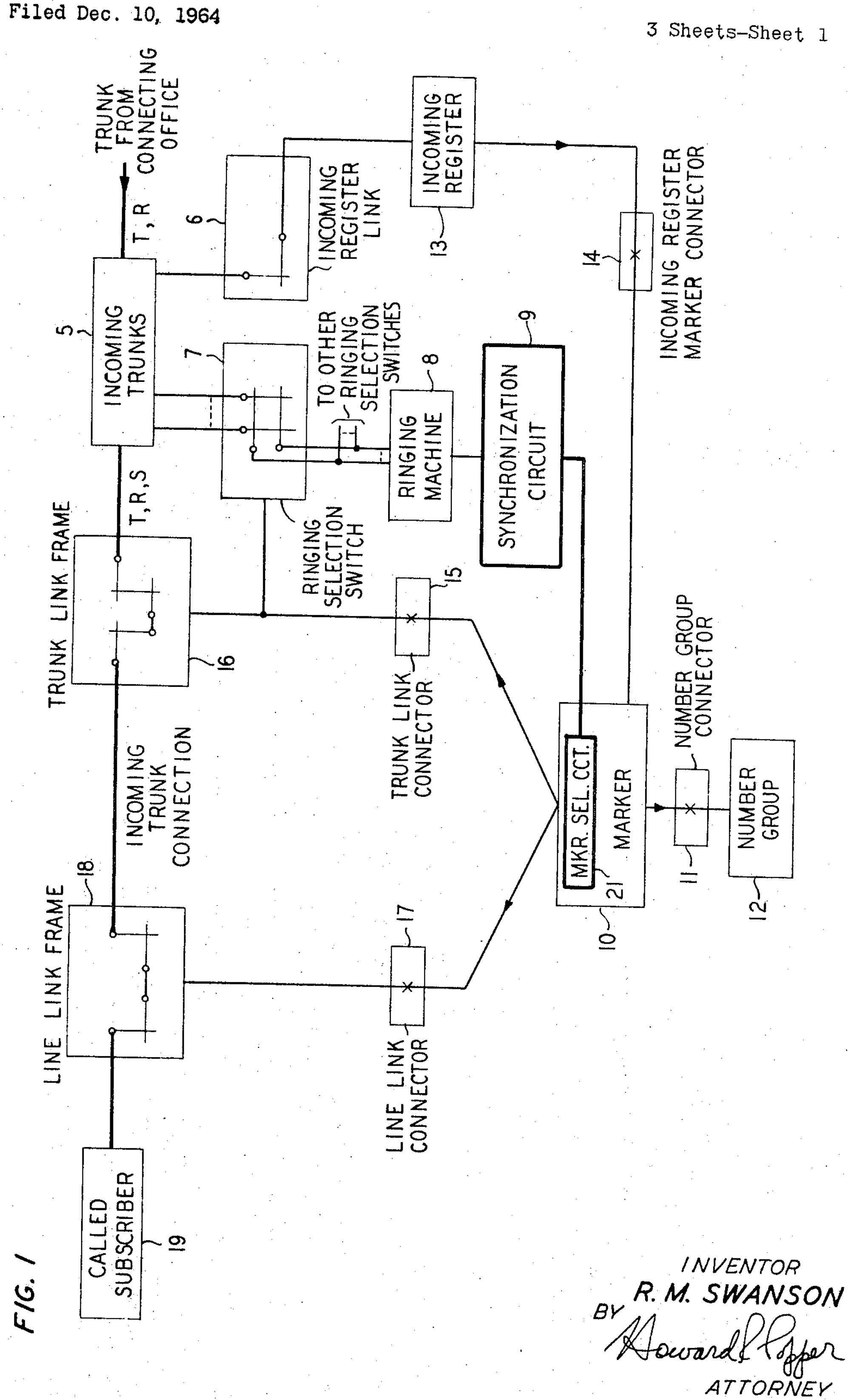
FIG. 1 is a block diagram of a crossbar telephone system incorporating my invention as a appliqué thereto.

My invention as previously mentioned can be utilized with a crossbar telephone system, for example, and the disclosure of FIG. 1 indicates by means of a block diagram, with the synchronization circuit 9 and marker selection circuit 21 in heavy outline, the invention incorporated into a cross bar telephone system such as that disclosed in A. J. Busch Patent 2,585,904, issued Feb. 19, 1952. Only the portion of the Busch crossbar system pertinent to the current discussion of ringing a called line on a terminating call has been included in FIG. 1, but the applicability of my invention to other portions of a crossbar telephone system as well as to other switching systems will be apparent to those skilled in the art.

Referring to FIG. 1 and to the manner in which the terminating call is transmitted either from a calling subscribed in the same office on an intra-office call or from an outside calling subscriber to a called subscriber such as subscriber 19 on FIG. 1, the seizure of one of incoming trunk circuits 5 causes the incoming register link 6 to connect the trunk to an incoming register 13. The register receives digital information pertaining to the called subscriber's number and in turn seizes a marker circuit 10 my means of the incoming register marker connector 14. In addition, the energization of the calling one of the incoming trunks 5 provides an operate path for a selected vertical of a crossbar switch shown as the ringing selection switch 7. Such a switch is disclosed, for example, in M. C. Goddard Patent 2,535,675, issued Dec. 26, 1950. The horizontal channels of ringing selection switch 7 are coupled to the ringing generator 8 which has a plurality of outputs each providing a different coded voltage signal which will ultimately cause a called subscriber's responsive ringing circuit to be rung in accordance with the particular coded output selected for that line. Thus, if one output of the ringing machine 8 presents on a selected brush thereof two seconds of ringing voltage followed by four seconds of "silent interval," a "2-seconds on, 4-seconds off" ringing cycle will be applied to the called line. A typical ringing generator or machine which may be used in this connection is disclosed in J. K. Mills et al. Patent 2,672,604, issued Mar. 16, 1954. It is noted that in the Mills et al, patent, cam springs, 1, 2 and 3 alternate in providing the two seconds of ringing voltage without any overlap.

When the marker circuit 10 has been seized a corresponding seizure of number group 12 via number group connector 11 subsequently informs the marker 10 of the variety of coded ringing to be applied to the particular called line. Such information supplied to the marker 10 will vary depending upon the class and type of line being called; for the sake of illustration, it will hereinafter be assumed that an individually served line is being called so that the market 10 is informed by the number group 12 to supply "2-second on, 4-seconds off" ringing to the called subscriber 19.

As most prior art ringing arrangements are presently constituted, a single horizontal channel of each ringing selection switch 7 is set aside for supplying only one phase of ringing voltage from the ringing machine 8 to the energized one of incoming trunks 5. Thus, the marker selection circuit 21 within marker 10 energizes the single ringing selection switch horizontal level by means of trunk link connector 15 which also establishes the incoming trunk connection between trunk link frame 16 and line link frame 18. Ordinarily, only a single output or phase from any particular ringing machine is connected to this single ringing selection switch level. Referring again to the Mills et al. patent, the single connected output might be that of, for example, camp spring 1 which generates ringing voltage only for the first two seconds of the 6-second ringing cycle. Where this is the case, absent my invention, random energization (as to time) of the single level of the ringing selections switch 7 results in a good probability that there will be no immediate application of ringing voltage to the ringer of called subscribed 19. For example, in the prior art, the probability is two-thirds that the seized one of incoming trunks 5 will be connected to the ringing generator 8 through ringing selection switch 7 during the four seconds of the silent interval; the delay can be anywhere from zero to four seconds, with an average delay to all stations called of 1.33 seconds. (Equivalent to the silent interval probability multiplied by the resultant delay or $2/3 \times 4/2$.)

My invention calls for a reassignment of certain horizontals on the ringing selection switch 7 so that no matter when the incoming trunk is energized, active ringing voltage will be present on some level of the ringing selection switch 7. This will permit selection of a proper level with respect to time to provide immediate ringing. With the 6-second ringing cycle assumed herein and which may be generated, for example, on cams 1, 2 and 3 of the ringing generator described in the Mills et al. patent, an assignment of two additional switch levels is utilized to make available ringing voltage at all times. Thus, three horizontal levels of each ringing selection switch 7 are utilized rather than one as in the prior art, and a plurality (i.e., three) of connections exists, one from each phase or output of ringing generator 8 to these horizontal levels of switch 7 in order to cover the entire 6-second cycle with ringing voltage. This serves to provide immediate ringing as long as the proper horizontal level is chosen by marker selection circuit 21.

Since the marker selection circuit 21 does the energizing of the ringing selection switch horizontals, my invention's synchronization circuit 9 couples the ringing generator 8 and the marker selection circuit 21 in marker circuit 10 in order to inform the selection circuit which ringing selection switch horizontals to energize at a particular time so that immediate ringing voltage will be applied to the called line over the trunk. The synchronization circuit 9 may be connected to additional coded outputs of the ringing generator 8, such additional outputs being synchronized with the generator's ringing voltage outputs so as to allow the synchronizing circuit 9 to determine which of the three ringing voltage outputs is "live" and also which one will subsequently be live for a minimum predetermined interval.

I achieve this result in one particular embodiment of my invention by utilizing a relay synchronization circuit coupled to a marker selection circuit, the latter being a modification-in-part of the marker circuitry disclosed in the above-cited Busch patent. The synchronization circuit and the marker selection circuit are disclosed on FIG. 2, while FIG. 3, which will be referred to herein to aid in the description of the operation of this circuitry, discloses the time relationship involved.

Initially, the synchronization circuit 9 (FIG. 2) is coupled over three of its leads to three corresponding coded voltage outputs of the ringing generator 8 described with respect to the block diagram and more fully disclosed in the above-cited Mills et al. patent. As indicated by the labeling of the lead inputs from the ringing machine to the synchronization circuit 9, codes D, E and F are supplied from the ringing machine to the synchronization circuit 9. Referring for a moment to FIG. 3, the time patterns of codes D, E and F are shown in the upper section thereof and these are coded outputs of the ringing generator 8 selected so as appropriately and sequentially to operate the synchronization circuit 9 as described hereinbelow. With reference to the FIG. 6 time diagram of the Mills et al. ringing machine patent, it may be noted that the coded outputs herein denominated as codes D, E and F correspond to the outputs of cam springs 7, 15 and 11, respectively of the Mills et al. disclosure.

The synchronization circuit 9 consists of three counting relays P, W and Z, the contacts of which serve to provide selecting ground to the marker selection circuit over leads BR1, BR2 or BR3. An alarm relay AL is also included to insure that proper cyclical operation of the synchronization circuit is occurring.

With reference to ringing codes A, A′ and A″, the time pattern of which is also shown in the upper portion of FIG. 3, and which correspond to the outputs of cam springs 1, 2 and 3 in the Mills et al. patent, each of these coded outputs or phases respectively provides two seconds of active ringing voltage for the period indicated in FIG. 3, followed by a 4-second silent interval. My invention is arranged to instruct the marker selection circuit 21 to select the level of the ringing selection switch 7 which is coupled to the one of codes A, A′ or A″ which is either in its first second of active ringing voltage at the time the incoming trunk is seized, or else to "forecast" a full 2-second ringing cycle of the next code should the incoming trunk be seized sometime during the last second of a particular output's two seconds of ringing voltage. In accordance with this feature, the maximum delay prior to the commencement of ringing is one second; in most cases, the delay will be substantially less than one second. In addition, should the incoming trunk be energized, say in the final one-tenth of the last second of a particular brush's two seconds of ringing voltage, marker holding and switching time would also dictate that the best choice for the marker to make would not be the instantaneously live brush (only live for one-tenth of a second more), but actually the subsequently activated brush. This feature guarantees that at least one full second of immediate ringing voltage will always be applied to the called line.

*Operation of synchronization circuit 9*

Figure 2:
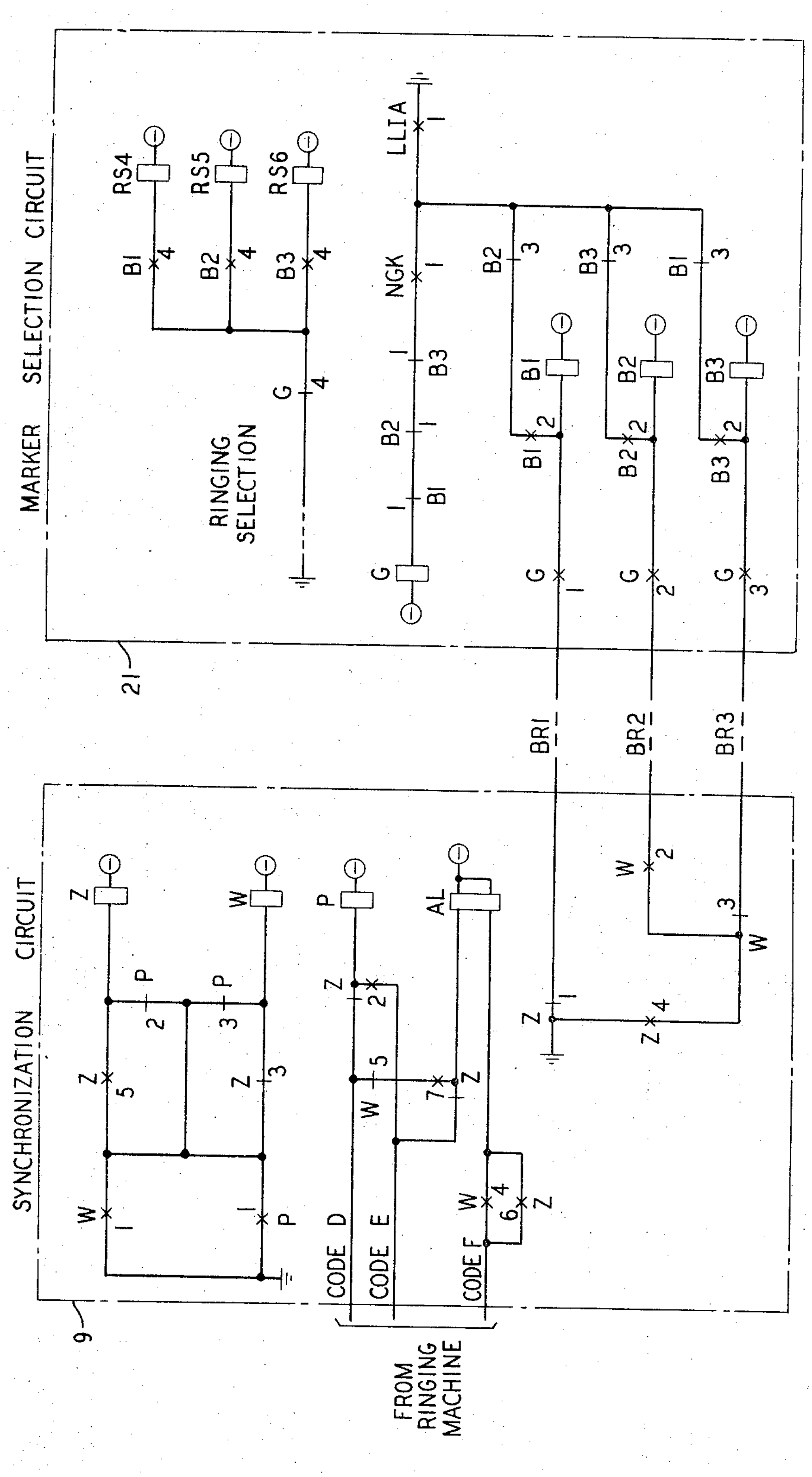
FIG. 2 shows the synchronization circuit and the marker circuit modifications constituting one embodiment of my invention.
Figure 3:
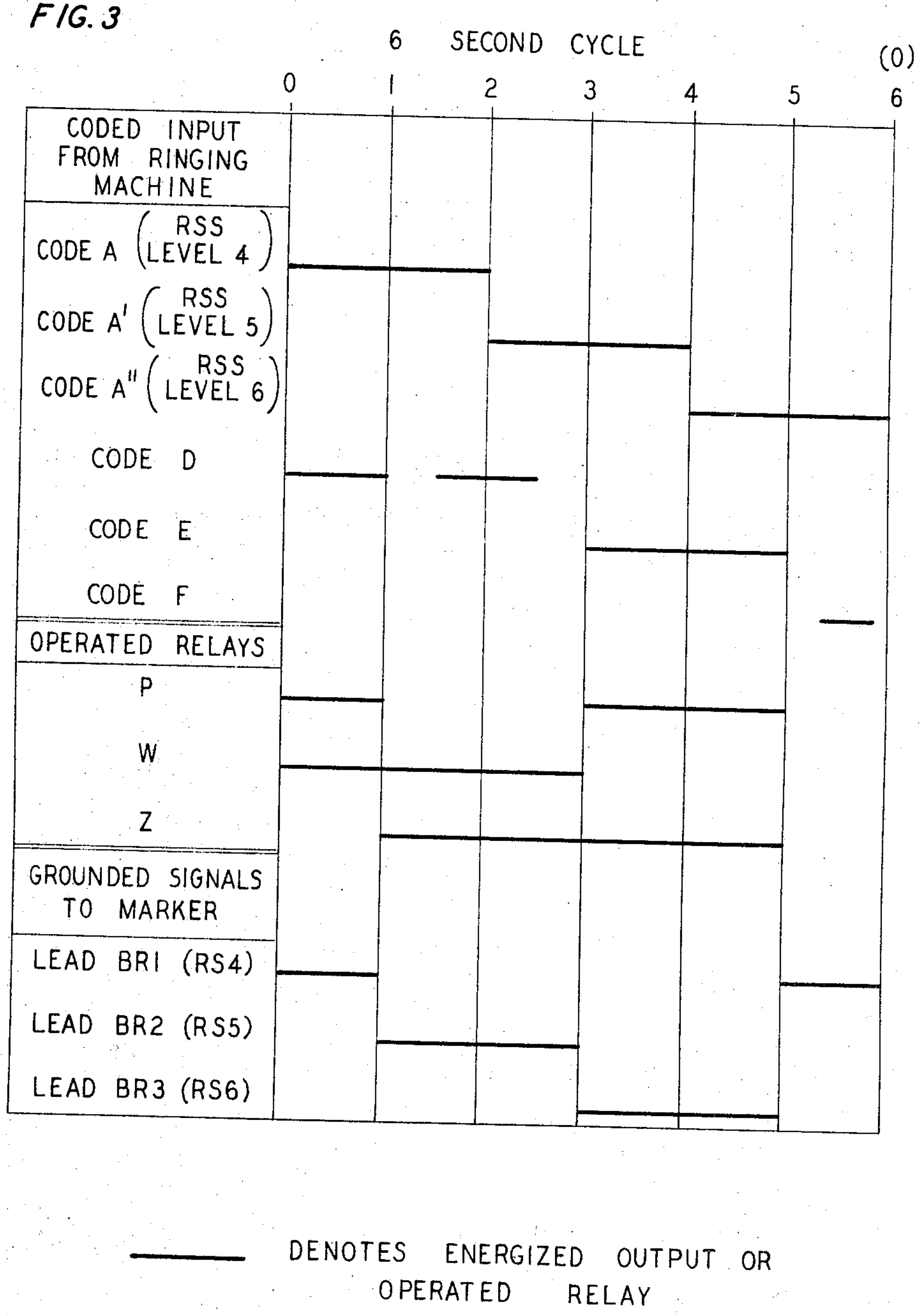
FIG. 3 is a time diagram indicating the relationship between the various coded outputs and operated relays and the ringing generator cycle.

Referring now to synchronization circuit 9 of FIG. 2 with all relays assumed to be initially released at the start or zero point of the 6-second cycle shown in FIG. 3, ground is initially provided to the marker selection circuit 21 over lead BR1 through normally closed break contact 1 or relay Z. However, before discussing ramifications of the application of such ground signals to the marker selection circuit 21, the operation of the synchronization circuit 9 in terms of its connection of the ringing machine 8 will first be described. Thus, referring also to FIG. 3 and particularly to code D shown thereon, it is seen that voltage is applied over the code D lead to operate relay P through the closed break portion of transfer contact 2 of relay Z. Relay P remains operated as long as ground is applied over the code D lead and relay Z is unoperated.

In the W–Z portion of the circuit, the operation of relay P closes an operating path for relay W from ground through make contact 1 of relay P, normally closed break contact 3 of relay Z, winding of relay W and negative battery. Relay W thus operates practically simultaneously with relay P and will be seen hereafter to remain operated for the first three seconds of the 6-second ringing cycle. However, since relay Z has not yet operated, the normal open condition of make contact 4 of relay Z prevents any lead other than lead BR1 to the marker selection circuit from being energized. This condition persists until the 1-second mark of the 6-second ringing cycle.

When the code D ground signal ends after one second of application, the P relay releases but the W relay remains operated over a locking path from ground through make contact 1 of relay W and break contact 3 of relay Z. An operating path is also set up to operate relay Z, this path proceeding from ground through make contact 1 of relay W, now closed break contact 2 of relay P, the winding of relay Z and negative battery. Relay Z therefore operates and establishes an operating path to be subsequently used to reoperate relay P in response to a code E signal from the ringing machine through the make portion of transfer contact 2 of relay Z (see below). At this time, however, the operation of relay Z does not disturb the operated condition of relay W which remains operated over a path including ground, make contact 1 of relay W, break contact 3 of relay P, winding of relay W and negative battery.

This simultaneous operated condition of relay W and Z, which persists from the 1-second until the 3-second mark of the 6-second ringing cycle, causes ground to be supplied to the marker selection circuit 21 over lead BR2 by virtue of the closed path from ground through make contact 4 of relay Z and make contact 2 of relay W to lead BR2. This instructional condition to the marker (relays W and Z both operated) is maintained for the two seconds indicated immediately above and persists until a signal is received from the ringing machine over the code E lead briefly alluded to above. This occurs at the 3-second mark of the 6-second ringing cycle as shown on FIG. 3.

When the signal arrives over the code E lead from the ringing machine to the synchronization circuit 9, the P relay is again operated through the make portion of transfer contact 2 of the Z relay. The operation of relay P interrupts the holding path for relay W and maintains relay Z in its operated condition by establishing another path for that relay from ground through make contact 1 of relay P, make contact 5 of relay Z, the winding of relay Z and negative battery. As long as the active signal remains applied to the code E lead, relays P and Z remain operated while relay W stays in its released state. This can be seen to supply ground to the marker selection circuit 21 over lead BR3 through make contact 4 of relay Z and break contact 3 of relay W. This condition persists for the 2-second interval between the 3- and 5-second marks of the 6-second ringing cycle which coincides with the presence of the input on the code E lead from the ringing machine 8 to the synchronization circuit 9.

When the signal on the code E lead terminates at the 5-second mark of the 6-second ringing cycle, relay P releases, thereby interrupting the operating path of relay Z by opening make contact 1 of relay P. For the 1-second interval between the 5- and 6-second marks of the ringing cycle when no coded input is delivered from the ringing machine to the synchronization circuit 9, relays P, W and Z all stay released. This serves to transfer the ground signal to the marker selection circuit 21 from lead BR3 to lead BR1 as indicated in the beginning of the ringing cycle description. Since the reoperation of relay P by the application of a signal to the code D lead at the zero mark (same as 6-second mark) of the ringing cycle only causes relay W to operate and does not affect relay Z, the ground signal to the marker selection circuit 21 persists for the 2-second interval spanning the last second of one ringing cycle and the first second of the next ringing cycle as indicated on the line labeled "lead BR1" in FIG. 3. The cycle then repeats in a manner identical to that already described.

*Operation of marker selection circuit 21*

With regard to the marker selection circuit 21, a gating relay G is operated when the marker 10 seizes number group 12 (FIG. 1) thereby operating the NGK relay in the conventional manner (winding of relay NGK not shown, but see column 82, lines 54 et seq. and FIG. 199 of the above-cited Busch patent); the LLIA relay (winding not shown) was previously operated and ground is thus provided to operate relay G through make contact 1 of relay LLIA, make contact 1 of relay NGK and the still closed break contacts 1 of relays B3, B2 and B1. The operation of the G relay at its make contacts 1, 2 and 3 cuts through the BR1, BR2 and BR3 leads, respectively, to the marker selection circuit 21 and allows energization of the appropriate one of relays B1, B2 or B3, respectively. Break contact 4 of the G relay prevents premature operation of ringing selection relays RS4–RS6 (corresponding to three relays, e.g., relays 264–266 of the above-cited Goddard patent, which, when operated, connect code A, A′ and A″ ringing voltage, respectively, to an incoming trunk). None of these relays can operate until the prior operation of one of relays B1–B3 causes relay G to release.

Selection circuit relays B1, B2 and B3 at their make contacts 4 selectively steer an operating ground to ringing selection relays RS4, RS5 and RS6, respectively, so that operation of one of relays B1–B3 in response to a signal from the synchronization circuit 9 will cause the corresponding ringing selection relay to operate and thus apply immediate ringing voltage to the called subscriber. For example, to illustrate only one operation of my invention, during the 2-second interval between the 1- and 3-second marks of the 6-second ringing cycle while lead BR2 from synchronization circuit 9 has ground thereon (see FIG. 3), relay B2 is operated through make contact 2 of relay G and locks to ground over its own make contact 2, closed break contact 3 of relay B3 and make contact 1 of relay LLIA. (Break contacts 3 of relays B1–B3 are included in order to establish a priority sequence should two of relays B1–B3 be simultaneously energized. These additional contacts will cause the higher numbered relay to have a priority so that relay B2 takes precedence over relay B1, relay B3 takes precedence over relay B2 and relay B1 takes precedence over relay B3. This further insures that at least normal ringing will not be interfered with.)

Returning to the illustrative operation of relay B2, this operation interrupts the operating path for relay G at break contact 1 of relay B2, causing ground to be closed through closed break contact 4 of relay G. Ringing selection relay RS5 is thus operated over a path including make contact 4 of relay B2, the relay's winding and negative battery. This causes the fifth horizontal level of the ringing selection crossbar switch 7, FIG. 1 (and see the Goddard patent), to apply code A′ ringing voltage to the called subscriber 19 over the seized one of incoming trunks 5 as discussed previously.

The "forecast" feature of applying ringing is thus seen to exist since the energization of the seized trunk anywhere between the 1- and 3-second marks of the 6-second ringing cycle causes the application of code A′ ringing voltage (from the 2- to the 4-second marks) to the called subscriber 19 over ringing selection switch level 5. This insures at least one full second of ringing (between the 3- and 4-second marks should the incoming trunk be energized very close to the 3-second mark), with a maximum of only one second of delay prior to ringing (should the incoming trunk be energized at the 1-second mark). More importantly, the average delay prior to ringing is drastically reduced (to about 0.25 second) by my invention and the probability that a significant delay will precede application of ringing voltage is also greately reduced.

Similarly, the other ringing selection relays RS4 and RS6 operate at other times to provide immediate ringing. That is, when ground is present on lead BR1 to marker selection circuit 21 (from the 5-second mark of one cycle to the 1-second mark of the next cycle), the resultant operation of relay B1 causes relay RS4 to operate and apply code A ringing voltage between the 0- and the 2-second marks. And the presence of ground on lead BR3 from the 3-second mark until the 5-second mark results in the operation of relay RS6, thus causing code A″ ringing voltage to be applied to the seized one of incoming trunks 5 between the 4- and 6-second marks.

A separate alarm feature is included in the synchronization circuit by means of connections from the coded inputs from the ringing machine through selected contacts of the W and Z relays to windings on the AL alarm relay. The basic approach is to insure, to a limited degree, that the sequence of operations and releasings of the W and Z relays is the proper one for the application of ground signals to the marker selection circuit 21 over leads BR1–BR3. For example, between the fifth and sixth seconds of the 6-second ringing cycle, ground appears on the code F lead from the ringing machine to the synchronization circuit 9. (This corresponds to the output of cam spring 11 in the Mills et al. disclosure.) During this interval, as can be noted on FIG. 3, neither relay W nor relay Z should be operated. Should relay W be erroneously operated during this time, the application of the code F signal will operate relay AL through make contact 4 of relay W. Contacts (not shown) of the AL relay can be arranged to operate alarm equipment (not shown) to drop a trouble card or take other appropriate action. Similarly, should the Z relay be erroneously operated at this time, ground over the code F lead will operate the AL alarm relay through make contact 6 of relay Z.

When ground is present on the code D lead (between the 0- and 1-second marks and also between the 1.5- and 2.5-second marks), it will be seen by reference to FIG. 3, that relay W should be operated throughout the interval from the 0-second mark to the 2.5-second mark. Relay Z is also operated from the 1- through the 5-second marks. If relay W erroneously releases between the 1.5- and 2.5-second marks, the signal on the code D lead will cause the AL relay to be energized through its upper winding over a path including closed break contact 5 of relay W and the make portion of transfer contact 7 of relay Z.

Finally, reference to FIG. 3 also discloses that during the application of code E ground to the synchronization circuit 9 from the ringing machine, relay Z should be continuously operated. If it is not, the alarm relay AL will be operated by virtue of the closed break portion of transfer contact 7 of relay Z.

Reference is made to copending application Serial No. 417,444, filed December 10, 1964, of L. F. Goeller, Jr., wherein a related invention is described.

It is to be understood that the above-described arrangements are illustrative of the application of the principles of the invention. Numerous other arrangements may be devised by those skilled in the art without departing from the spirit and scope of the invention.

What is claimed is:

1. In a telephone system, a plurality of telephone lines, line link and trunk link networks, a plurality of trunks each having an appearance in said trunk link network, ringing generator means including a plurality of ringing and control outputs successively activated to provide ringing and control signals, ringing selection means for establishing connections from said ringing generator means to said trunks, marker means responsive to the seizure of any one of said trunks by an incoming call for causing said trunk link and line link networks to establish a connection to the called one of said lines and for operating said ringing selection means to couple selected ones of said ringing outputs of said ringing generator means with said seized trunks, and synchronizing means including counting means responsive to said ringing generator control signals for governing said marker means to cause said ringing selection means to connect said energized trunks to an immediately active one of said outputs.

2. A telephone system comprising a plurality of lines, a plurality of trunks, a plurality of crossbar link circuits for connecting incoming calls to said trunks and lines, ringing machine means for generating a first plurality of successively activated equal duration ringing voltage outputs and a second plurality of sequential coded outputs of different durations, ringing selection crossbar switch means including a plurality of switching levels to each of which a respective one of said first plurality of outputs is connected, marker means for operating said ringing selection means to apply one of said first plurality of outputs to one of said trunks, and synchronizing means responsive to said second plurality of coded outputs for causing said marker means to select the one of said levels corresponding at that instant and within a predetermined interval thereafter to the activated one of said ringing voltage outputs.

3. A telephone system in accordance with claim 2 wherein said synchronizing means includes a plurality of counting relays responsive to successive appearances of said coded outputs for causing said marker means to connect to said trunks said selected one of said levels connected to the activated one of said ringing voltage outputs.

4. A telephone system in accordance with claim 3 wherein said synchronizing means includes alarm means responsive to said coded outputs and to the erroneous operation of at least one of said counting relays.

5. In a telephone system, a plurality of telephone lines, a plurality of trunk means seizable for connecting incoming calls to said lines, ringing means for generating a plurality of phase-displaced ringing signals, a plurality of ringing selection means each comprising crossbar switching means including a plurality of levels, particular levels of said crossbar switching means each corresponding to one of said signals, said ringing selection means coupling said ringing means and said trunk means, marker means for energizing said ringing selection means, and synchronizing means responsive to said ringing means for controlling said marker means to energize the one of said ringing selection means levels coupled to the instantaneously active one of said signals.

6. A telephone system in accordance with claim 5 wherein said signals persist for a fixed interval and wherein said synchronizing means includes means for causing said marker means to energize the one of said ringing selection means levels coupled to the one of said signals to be subsequently generated if said trunk means are seized past a predetermined point in time during said interval.

7. A switching system utilizing ringing machines producing a plurality of output and control codes, each of said codes having several phases, and a ringing selection electromechanical switch means defining a plurality of output levels for connecting one of said output codes applied to one of the levels of said switch to an incoming trunk, characterized in that all the phases of at least one of said output codes are applied to respective levels of the same switch and that synchronizing means are included for selecting the one of said levels connected to the active phase of the one of said output codes to be connected to said incoming trunk, said synchronizing means including relay counting means responsive to said control codes.

8. In a crossbar switching system, a plurality of communication stations, a plurality of incoming trunks, switching means for establishing communication paths between said stations and said trunks, and means for altering called ones of said stations, said alerting means including a plurality of crossbar ringing selection switches each having a plurality of levels, a ringing generator for generating equal duration multi-phase ringing signals and control signals of unequal duration, a synchronization circuit including a pair of relays defining a counting circuit and a third relay responsive to said control signals of unequal duration for operating said pair of relays, a marker for establishing connections between selected levels of said ringing selection switches and said stations through said trunks, and a marker selection circuit responsive to operation of said pair of relays for establishing said connections from predetermined ones of said ringing selection switch levels to said stations only during or immediately prior to the appearance of one of said ringing signals at said predetermined ones of said ringing selection switch levels.

References Cited

UNITED STATES PATENTS

| | | | |
|---|---|---|---|
| 2,846,513 | 8/1958 | Van Mierlo et al. | 179—18.82 |
| 3,005,875 | 10/1961 | Scheunert | 179—18.82 |
| 3,078,347 | 2/1963 | Laas | 179—18.82 |
| 3,085,133 | 4/1963 | Hutton | 179—18.82 |

KATHLEEN H. CLAFFY, *Primary Examiner.*

H. ZELLER, *Assistant Examiner.*